2,899,949

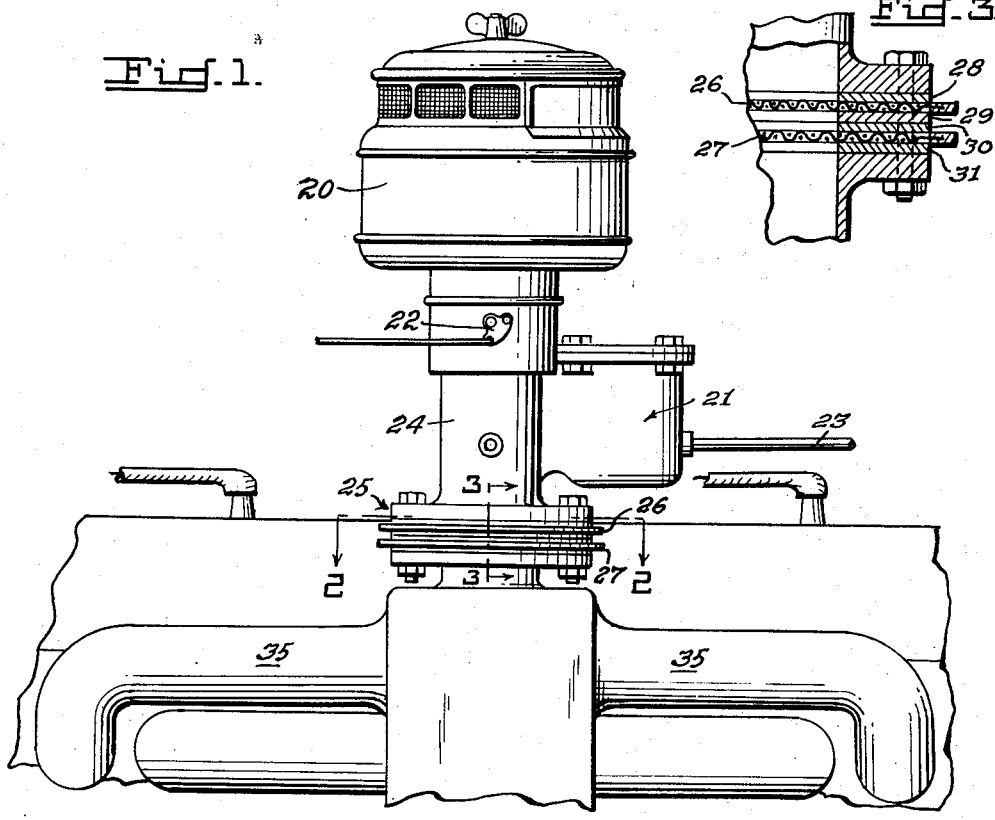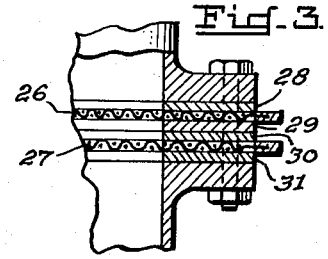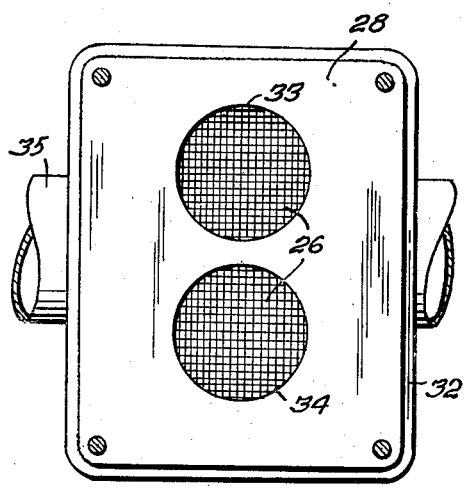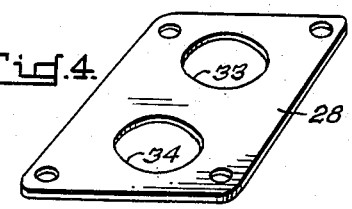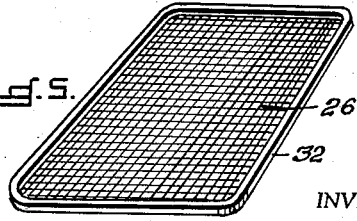
Aug. 18, 1959    J. B. HICKS    2,899,949
DEVICE FOR IMPROVING THE OPERATION OF
INTERNAL COMBUSTION ENGINES
Filed Jan. 31, 1957
INVENTOR
J. Byron Hicks United States Patent Office 2,899,949
Patented Aug. 18, 1959

DEVICE FOR IMPROVING THE OPERATION OF INTERNAL COMBUSTION ENGINES

J. Byron Hicks, Euclid, Ohio

Application January 31, 1957, Serial No. 637,500

13 Claims. (Cl. 123—119)

This invention relates to internal combustion engines, and to the operation thereof, and particularly to a method and device for subjecting the carburetion mixture to catalytic dissociation.

Objects of the invention are: to promote the combustion process and overcome the adverse effect of the combustion chamber walls thereon; to avoid the formation of carbon deposits in internal combustion engines; to overcome preignition; to reduce the high octane requirements of automotive engines and render possible the improved operation thereof on lower grade fuels. Other objects will hereinafter appear.

It is known that a small increase in the water vapor content of the intake air admitted to an internal combustion engine will substantially reduce the octane requirements of that engine if the increased vapor content is continued for an equivalent hundred miles or more. Engines which have utilized this increased water vapor intake have been disassembled and the combustion chamber was found to be completely free of carbon deposit. It is also known that the introduction of hydrogen rich hydrocarbons will have a like effect in cleaning the combusion chamber surfaces and lowering the octane requirements of the engine.

In the past efforts have been made to improve the operating characteristics of internal combustion engines, by introducing, either directly in the fuel, or separately therefrom into the carburetion mixture, various agents. Among such agents there may be mentioned water vapor and butane.

It is noteworthy that the walls of the combustion chambers of an internal combustion engine have an adverse effect on the combustion process. A poisoning action takes place at the surface of the combustion chamber walls, and a visible result of this failure of the combustion process is discernible in the deposition of carbon. It has been suggested that this posioning effect might be avoided by a suitable selection of the materials composing the walls.

Proceeding in accordance with my invention, I have found that if a body of selected catalytic material is suitably disposed to effect passage of the vapors of the carburation mixture thereover, the combustion poisoning effect of the walls of the combustion chambers can be effectively counteracted. Further important results in the specific applications of this discovery are hereinafter described.

In the practice of the invention I provide means for supporting the catalytic material in the path of the vapors in the intake passage of the engine. For this purpose I employ a suitable reticulated element fully hereinafter described, or preferably, a plurality of such elements.

For purposes of illustration reference may be had to the accompanying drawings.

Figure 1 is an elevational view showing the location of a catalytic dissociator in accordance with the invention, and its relation to the associated elements of an internal combustion engine.

Figure 2 is a plan view of the dissociator, taken along plane 2—2 of Figure 1, showing the structure of the dissociator in more detail.

Figure 3 is a fragmentary cross-sectional view taken at plane 3—3 of Figure 1, showing the detail of the mounting of the screens in the dissociator.

Figure 4 shows a gasket, and Figure 5, shows a screen, in disassembled position.

More particularly, Figure 1 shows in an automotive internal combustion engine the conventional air and fuel intake controlling elements consisting of air filter 20, carburetor 21, inlet air valve control 22, fuel inlet conduit 23. After mixing of the fuel and air, and passage of the mixture into the throat 24, the vapors enter the dissociator 25. The latter consists essentially of two screens 26 and 27, mounted in parallel spaced relationship, by gaskets 28, 29, 30 and 31.

Figure 2 shows the uppermost gasket 28, and the uppermost screen 26. The gasket 28 is provided with two openings 33 and 34 through which the fuel and air mixture passes. The vapors continue into contact with screen 26 and screen 27 consecutively, and thereafter pass into intake manifold 35.

As can be understood by reference to Figure 3, the screens and gaskets are mounted in such a way that disassembly and mounting of new screens can be readily accomplished if desired. As most clearly shown in Figure 5, the screen is desirably provided with a reinforcing element 32. Also, again referring to Figure 3, it will be understood that no substantial change is necessary to enable the dissociator assembly to accommodate any desired number of screens, i.e. one screen, or a plurality of screens respectively.

Referring now to the screens in more detail, these present to the carburetion mixture a catalytic surface. The use of a screen mesh coated with a suitable catalytic material is a convenient expedient in providing a suitable catalytic surface. It is desirable that the wire size be such as not to cause more than a 10 percent throttling effect. I have found that an 8 or 10 mesh screen may be used satisfactorily. The plating thickness of the catalytic material need not be more than .001 inch.

Catalytic materials suitable in the practice of the invention comprise those hydrogen ion forming catalysts that increase the concentration of the free hydrogen ions in the combustion mixture, such, for example as cadmium and nickel. I have found that cadium and nickel are particularly active with hydrocarbons, along with platinum derivatives, as pure elements or in the forms commercially available and in the form of metal alloys.

To further illustrate the invention, the following examples are cited.

*Example I*

Two cadmium plated 10 mesh screens separated one from the other by a distance of approximately ⅛ inch, using two 1/16 inch gaskets, were placed between the carburetor and the intake manifold. In operating the engine an improvement in combustion and reduction in carbon formation was noted. However at speeds higher than 50 miles per hour the observable reduction of pre-ignition fell off notably.

*Example II*

Thereafter, the cadmium plated screens were replaced with a pair of nickel plated 8 mesh screens. This resulted in a reduction in pre-ignition, the result being constant with various makes of gasoline, and over a wider range of speeds.

*Example III*

Next, a combination of a cadmium 10 mesh screen, ⅛ inch above a nickel 8 mesh screen, was tried. The results were very gratifying. Essentially all pre-ignition was eliminated with this combination at any speed and with any make of gasoline. Moreover with this combination installed between the carburetor and the intake manifold and driving for long distances at sustained speeds of about 65 miles per hour, no decline in the effect of the screens could be observed.

If the carburetor has both high speed and low speed throats, as is the case with the four barrel carburetors with which many modern cars are equipped, the catalytic dissociator may be placed only in the medium and low speed throats. In other cases the screens may cover the entire carburetor throat.

From the foregoing description and illustrations, further details within the scope of my invention will be apparent to those skilled in the art, or may further be developed. Having set forth the aforesaid examples by way of illustration and not of limitation, what I claim and desire to protect by Letters Patent is as follows:

1. A device for improving the operation of an internal combustion engine comprising means for supporting catalytic material in the path of the vapors in the intake passage of the engine, said means comprising a plurality of reticulated supporting elements, and thereby supported catalytic material comprising separate catalysts separately supported by said reticulated elements.

2. A device for improving the operation of an internal combustion engine comprising means for supporting catalytic material in the path of the vapors in the intake passage of the engine, said means comprising a screen, said catalytic material composing the surface of said screen.

3. A device for improving the operation of an internal combustion engine comprising means for supporting catalytic material in the path of the vapors in the intake passage of the engine, said means comprising a plurality of screens, said screens being respectively coated with different catalysts.

4. A device according to claim 3 wherein two screens are employed.

5. A device according to claim 4 wherein one screen is coated with cadmium, and the other is coated with nickel.

6. A device for improving the operation of an internal combustion engine adapted to operate on a fuel composed primarily of vaporizable hydrocarbons, said engine comprising means to admix said fuel with an oxygen-containing gas to form a combustion mixture, and an intake passage whereby said mixture is led into the combustion chamber or chambers of said engine, said device being located in said intake passage, and comprising means for supporting catalytic material in the path of said combustion mixture, said catalytic material comprising a hydrogen ion forming catalyst.

7. A device for improving the operation of an internal combustion engine adapted to operate on a fuel composed primarily of vaporizable hydrocarbons, said engine comprising means to admix said fuel with an oxygen-containing gas to form a combustion mixture, and an intake passage whereby said mixture is led into the combustion chamber or chambers of said engine, said device being located in said intake passage, and comprising a screen composed of wire mesh the surfaces of said wires being composed of a catalytic material.

8. A device for improving the operation of an internal combustion engine adapted to operate on a fuel composed primarily of vaporizable hydrocarbons, said engine comprising means to admix said fuel with an oxygen-containing gas to form a combustion mixture, and an intake passage whereby said mixture is led into the combustion chamber or chambers of said engine, said device being located in said intake passage and comprising a sequence of wire mesh screens, the surfaces of a plurality of said screens being composed of catalytic materials, one screen having a surface composed of a catalytic material, different from that of a preceding screen, whereby the combustion mixture is brought into contact first with one of said catalytic materials, and thereafter into contact with another of said catalytic materials.

9. The method of operating an internal combustion engine wherein a combustion mixture of a fuel composed primarily of vaporizable hydrocarbons and an oxygen-containing gas is formed and thereafter introduced into the combustion chamber or chambers of said engine, comprising subjecting said combustion mixture, prior to its introduction into said combustion chamber or chambers to the action of a hydrogen ion forming catalyst.

10. The method of operating an internal combustion engine wherein a combustion mixture of a fuel composed primarily of vaporizable hydrocarbons and an oxygen-containing gas is formed and thereafter introduced into the combustion chamber or chambers of said engine, comprising subjecting said combustion mixture, prior to its introduction into said combustion chamber or chambers to the action of a hydrogen ion forming catalyst and thereby increasing the concentration of free hydrogen ions in the combustion mixture.

11. The method of operating an internal combustion engine wherein a combustion mixture of a fuel composed primarily of vaporizable hydrocarbons and an oxygen-containing gas is formed and thereafter introduced into the combustion chamber, or chambers of said engine, comprising subjecting said combustion mixture, prior to its introduction into said combustion chamber or chambers to the action of a catalyst selected from the class consisting of cadmium, nickel, platinum and the catalytically active derivatives and alloys thereof.

12. The method of operating an internal combustion engine wherein a combustion mixture of a fuel composed primarily of vaporizable hydrocarbons and an oxygen-containing gas is formed and thereafter introduced into the combustion chamber or chambers of said engine, comprising subjecting said combustion mixture, prior to its introduction into said combustion chamber or chambers to the action in sequence of a plurality of catalysts.

13. The method of operating an internal combustion engine wherein a combustion mixture of a fuel composed primarily of vaporizable hydrocarbons and an oxygen-containing gas is formed and thereafter introduced into the combustion chamber or chambers of said engine, comprising subjecting said combustion mixture, prior to its introduction into said combustion chamber or chambers to the action in sequence of a plurality of catalysts selected from the class consisting of cadmium, nickel, platinum and the catalytically active derivatives and alloys thereof.

References Cited in the file of this patent

UNITED STATES PATENTS

| | | |
|---|---|---|
| 1,717,767 | Diaz | June 18, 1929 |
| 1,941,487 | Portail | Jan. 2, 1934 |
| 2,839,037 | McKeever | June 17, 1958 |